United States Patent

[11] 3,544,772

[72] Inventor Richard Michael Morris
Romsey, England
[21] Appl. No. 638,324
[22] Filed May 15, 1967
[45] Patented Dec. 1, 1970
[73] Assignee The General Electric Company Limited
London, England
a British company
[32] Priority May 25, 1966
[33] Great Britain
[31] No. 23480/66

[54] ELECTRIC BISTABLE CIRCUITS
6 Claims, 2 Drawing Figs.

[52] U.S. Cl. .......... 235/92, 317/148.5
[51] Int. Cl. .......... H03k 25/02, H03k 23/03
[50] Field of Search .......... 235/92(8,3); 328/52, 193; 307/289; 317/140, 148.5; 335/78, 79

[56] References Cited
UNITED STATES PATENTS

| | | | |
|---|---|---|---|
| 2,584,990 | 2/1952 | Dimond | 235/92 |
| 2,665,845 | 1/1954 | Trent | 235/92 |
| 3,118,091 | 1/1964 | De Sautels | 317/154 |
| 3,366,806 | 1/1968 | Dellenbaugh | 307/262 |

*Primary Examiner*—Maynard R. Wilbur
*Assistant Examiner*—Joseph M. Thesz, Jr.
*Attorney*—Kirschstein, Kirschstein & Ottinger

ABSTRACT: An electric bistable circuit which may be utilised in binary counters comprises a single transistor having the energising winding of an electromagnetic relay connected in its emitter-collector circuit, a capacitive element connected between its base electrode and an input point, and a circuit including a pair of contacts of the relay to apply either a positive or a negative potential to the input point in dependence upon the state of the relay, the bistable circuit being switched from one condition to the other by temporarily earthing the input point.

PATENTED DEC 1 1970

3,544,772

INVENTOR
RICHARD MICHAEL MORRIS
BY [signature]
ATTORNEYS

ELECTRIC BISTABLE CIRCUITS

This invention relates to electric bistable circuits.

A bistable circuit usually employs two active elements such as thermionic valves or transistors and is arranged so that a different one of these elements is conducting in each of the two stable states of the circuit.

It is an object of the present invention to provide an electric bistable circuit which employs only one active element.

According to the present invention, in an electric bistable circuit there are provided a single active element that is arranged to be controlled by the voltage applied, during operation to a control electrode thereof, capacitive element which is connected in a path between said control electrode and an input conductor and which is arranged to be charged, during operation, so that when said active element is conducting a voltage of one polarity relative to a reference voltage is obtained on said input conductor and when said element is nonconducting a voltage of the opposite polarity relative to said reference voltage is obtained on said input conductor, switching means that is arranged to effect a change in the conduction condition of said element, during operation, upon each actuation thereof by applying said reference voltage to said input conductor so as to produce a sudden change in the voltage of that conductor and a consequent change in the voltage of said control electrode, and bias means arranged so that, during operation, when said element assumes its conducting condition a bias voltage is applied to said control electrode for sustaining that condition until the next actuation of said switching means.

The said active element may be a transistor and the said control electrode may comprise the base electrode of that transistor.

According to a feature of the present invention, an electric bistable circuit comprises a transistor that is arranged to be controlled by the voltage applied, during operation, to a base electrode thereof, a capacitive element connected in a path between said base electrode and an input conductor, a relay of which the state depends, during operation, upon the conduction condition of said transistor such that when said transistor is conducting contacts of said relay complete a bias path to said base electrode to maintain this conduction and further contacts thereof establish a path for path for charging said capacitive element so that a voltage of a predetermined polarity relative to a reference voltage is obtained on said input conductor, a charging path arranged so that, during operation, when said transistor is nonconducting said capacitive element is charged whereby a voltage of a polarity relative to said reference voltage that is opposite to said predetermined polarity is obtained on said input conductor and switching means that is arranged to effect a change in the condition of said transistor, during operation, upon each actuation thereof by applying said reference voltage to said input conductor so as to produce a sudden change in the voltage of that conductor and a consequent change in the voltage of said base electrode.

The switching means may comprise normally open electric contacts which, when actuated, connect said input conductor directly to a further conductor in said circuit that is maintained at said reference voltage during operation. These contacts may be adapted for na manual actuation.

The relay may have an energising winding connected in series with the emitter/collector path of said transistor so that this winding is energised and the relay is operated when said transistor is rendered conducting. Alternatively, the relay may have an energising winding connected in parallel with the emitter/collector path of said transistor and may be arranged so that, during operation, this winding is energised to operate the relay when said transistor is rendered nonconducting.

One embodiment of an electric bistable circuit in accordance with the present invention, and a binary counter incorporating four such bistable circuits, will now be described by way of example with reference to the accompanying drawings, of which:

Figure 1:
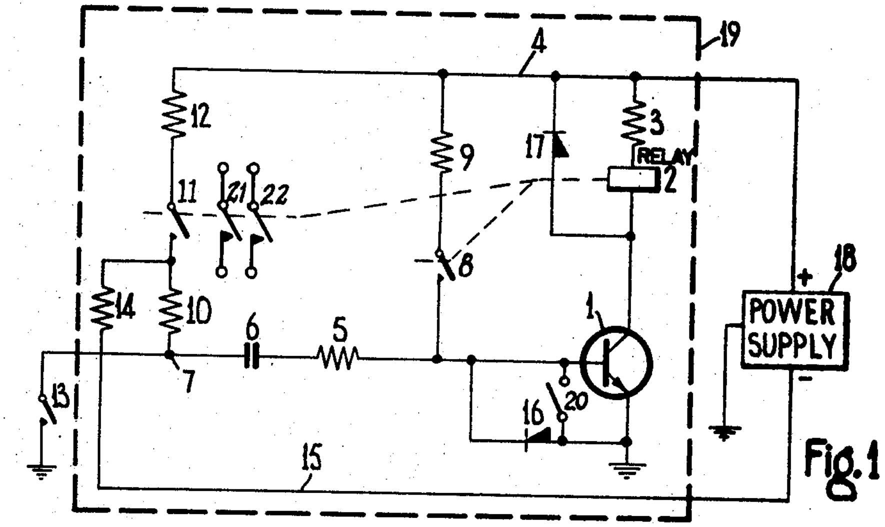
FIG. 1 shows the bistable circuit diagrammatically.

Referring to FIG. 1 the bistable circuit employs a single n-p-n type junction transistor 1 which has its emitter electrode connected directly to earth, and has its collector electrode connected by way of the energising winding of an electromagnetic relay 2 and a resistor 3 to a positive supply line 4. The base electrode of the transistor 1 is connected by way of a resistor 5 and a capacitor 6 in series to an input point 7 and also by way of normally open contacts 8 of the relay 2 and a resistor 9 to the positive supply line 4. The input point 7 is connected by way of a resistor 10, further normally open contacts 11 of the relay 2 and a low value resistor 12 all in series to the positive supply line 4 and also by way of normally open contacts 13 to earth. The junction between the resistor 10 and the contacts 11 of the relay 2 is connected by way of a resistor 14 to a negative supply line 15. A rectifier element 16 is connected between the base and emitter electrodes of the transistor 1 and is poled so as to prevent the potential of the said base electrode from becoming substantially more negative than that of the emitter electrode. A rectifier element 17 is connected across the energising winding of the relay 2 and is poled so as to prevent the potential of the collector electrode of the transistor 1 from becoming substantially more positive than that of the positive supply line 4, as may otherwise occur in operation upon the collapse of the magnetic field produced by energisation of the said winding.

In operation of the circuit, the positive and negative supply lines 4 and 15 respectively are maintained at approximately 50 volts positive and 50 volts negative to earth respectively by means of a power supply 18.

Let it be assumed that initially the transistor 1 is nonconducting so that the relay 2 is not operated and its contacts 8 and 11 are open. The capacitor 6 is charged so that the input point 7 is at about the same potential as the negative supply line 15 and the base electrode of the transistor 1 is at approximately earth potential. The charging circuit for the capacitor 6 is provided by the resistors 10 and 14, the power supply 18, the rectifier element 16 and the resistor 5. When the contacts are closed the said input point 7 is connected directly to earth. Thus there is a sudden rise of about 50 volts in the potential of the input point 7. A corresponding change in potential is applied to the base electrode of the transistor 1, and the transistor 1 conducts to energise the winding of the relay 2.

Initially conduction of the transistor 1 is maintained by the discharge of the capacitor 6 through the resistor 5 and the base-emitter junction. During this initial period the relay 2 operates and its contacts 8 complete a circuit by way of the resistor 9 for sustaining conduction of the transistor 1 and its contacts 11 complete a circuit by way of the resistors 12 and 10 between the positive supply line 4 and the input point 7. Thus when the relay 2 is operated the base electrode of the transistor 1 attains a steady potential which is slightly positive with respect to earth. When the contacts 13 open the capacitor 6 charges so that the potential of the input point 7 rises to almost 50 volts positive with respect to earth, this being the potential of the positive supply line 4. The charging circuit is provided by the resistor 10, the contacts 11 of the relay 2, the resistor 12, the power supply 18, the base-emitter junction of the transistor 1 and the resistor 5.

When subsequently the contacts 13 are closed the potential of the input falls by almost 50 volts. The potential applied to the base electrode of the transistor 1 also falls but the rectifier element 16 prevents the base electrode potential falling much below earth potential. If this was not the case permanent damage to the said transistor might result. The fall in potential of the base electrode of the transistor 1 is such as to stop the transistor 1 conducting. Although the capacitor 6 discharges by way of the rectifier element 16 and the resistor 5 the rate of discharge is sufficiently retarded by the resistor 5 to ensure the release of the relay 2 and the opening of its contacts 8 and 11 to prevent conduction of the transistor 1 recommencing at this stage. When the contacts 13 open the capacitor 16 is charged so that the potential of the input point 7 falls to about 50 volts negative with respect to earth. The circuit conditions then correspond to those initially assumed.

Figure 2:
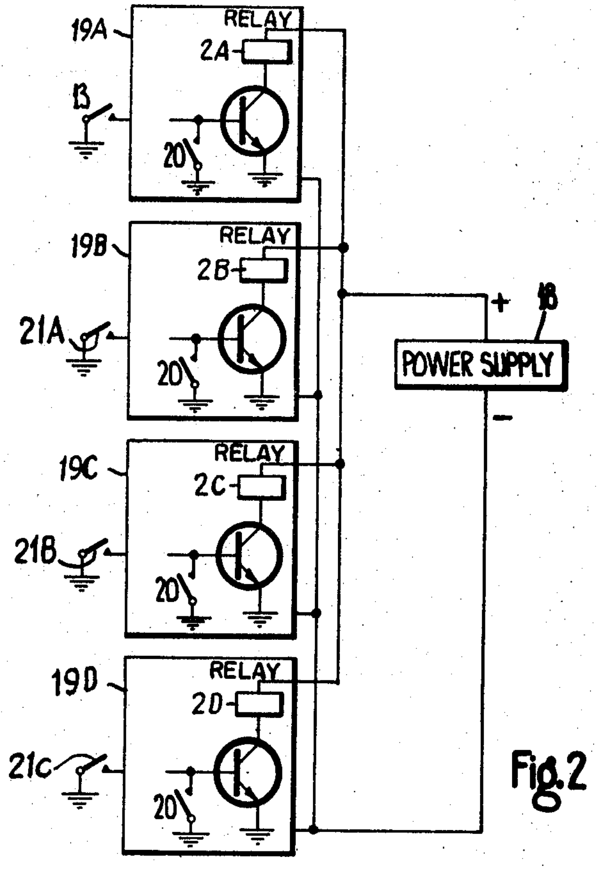
FIG. 2 shows the binary counter schematically.

The contacts 13 may be either manually operated or may be operated by a further electromagnetic relay (not shown). Referring to FIG. 2, the binary counter comprises four of the bistable circuits 19 shown in FIG. 1, namely, circuits 19A, 19B, 19C and 19D, although it will be appreciated that any reasonable number of circuits may be used. The relays 2A, 2B and so on in these circuits 19 are each provided with a third pair of contacts 21A, 21B and so on, the contacts 21A of the relay in the first of these bistable circuits 19A being connected in place of the contacts 13 in the second circuit 19B and so on, such that the four circuits 19 are connected effectively in cascade. From the above description of the circuit 19 it will be appreciated that the relay 2A has to be energised twice to effect the energization and release of the relay 2B once, four times to effect the energization and release of the relay 2C and so on. The counter may be reset to zero by applying earth potential to the base electrodes of the transistor 1 by way of respective resetting contact 20. The state of the counter may be represented by the condition of further contacts 22 of the relays in the four bistable circuits 19.

I claim:

1. An electric bistable circuit comprising a transistor, an electromagnetic relay, means to energise the relay in dependence upon the conductive condition of said transistor, an input point, a capacitive element, means connecting the capacitive element between said input point and a control electrode of said transistor, a source of positive and negative bias potentials, means selectively to apply positive and negative bias potentials from said source to said input point in dependence upon the state of said relay, means selectively to maintain conduction in said transistor in dependence upon the state of said relay, and means selectively to connect said input point to a point of a reference potential intermediate said positive and negative bias potentials whereby in operation transient potentials are applied by way of said capacitive element to the control electrode of said transistor in a sense to change the conductive condition of said transistor.

2. An electric bistable circuit in accordance with claim 1 in which an energising winding of said relay is connected in series with the emitter-collector path of said transistor.

3. An electric bistable circuit in accordance with claim 1 in which said means selectively to apply bias potentials to said input point comprises resistive means connecting said input point to a negative terminal of said source and means including contacts of said relay selectively to connect said input point to a positive terminal of said source in dependence upon the state of said relay.

4. An electric bistable circuit in accordance with claim 3 in which said resistive means comprises two resistors connected in series between said negative terminal and said input point, and said means including contacts of said relay interconnects the junction between said two resistors and the positive terminal.

5. An electric bistable circuit in accordance with claim 1 in which said means selectively to maintain conduction in said transistor comprises a path including contacts of said relay selectively to apply a forward bias current to the base-emitter junction of said transistor.

6. An electric binary counter comprising a plurality of bistable circuits each in accordance with claim 1, contacts of the relay in any one bistable circuit forming the means in a in a succeeding bistable circuit selectively to connect the input point to a point of reference potential.